United States Patent
Li et al.

(10) Patent No.: US 7,020,334 B2
(45) Date of Patent: Mar. 28, 2006

(54) CIRCUIT FOR EXTRACTING CONNECTED COMPONENT FEATURES FROM AN IMAGE

(75) Inventors: Guoxing Li, Beijing (CN); Bingxue Shi, Beijing (CN)

(73) Assignee: Winbond Electronics Corporation, Hsinchu (TW)

( * ) Notice: Subject to any disclaimer, the term of this patent is extended or adjusted under 35 U.S.C. 154(b) by 621 days.

(21) Appl. No.: 10/192,153

(22) Filed: Jul. 11, 2002

(65) Prior Publication Data

US 2004/0008887 A1    Jan. 15, 2004

(51) Int. Cl.
*G06K 9/46* (2006.01)
(52) U.S. Cl. ...................................... 382/194
(58) Field of Classification Search .................. 382/181
See application file for complete search history.

(56) References Cited

U.S. PATENT DOCUMENTS

2004/0037464 A1 * 2/2004 Shi et al. ..................... 382/190

OTHER PUBLICATIONS

Guoxing Li; Bingxue Shi. "Unconstrained handwritten digit VLSI recognition system based on combined neural networks",5th International Conference on Solid-State and Intergrated Circuit Technology, 1998, pp. :348-351.*

Kinget, P.: Steyaert, M., "A programmable analogue CMOS chip for high speed image processing based on celluar neural networks", Proceedings of the IEEE 1994 Custom Intergrated Circuits Conference, May 1-4, 1994, pp.: 570-573.*

Rodrigues-Vazquez, Angel; et al., "Current-Mode Techniques for the Implementation of Continuous- and Discrete-Time Cellular Neural Networks", IEEETransactions on Circuits and systems— II: Analog and Digital Signal Proceesing, vol. 40, No. 3, Mar. 1993.*

(Continued)

*Primary Examiner*—Jingge Wu
*Assistant Examiner*—Jordan Kuhn
(74) *Attorney, Agent, or Firm*—Finnegan, Henderson, Farabow, Garrett & Dunner, L.L.P.

(57) ABSTRACT

A circuit for extracting a connected component feature from an input image includes an input stage, a counting stage, a bit-preparing stage, and a bit-output stage. The input stage receives a bit pattern and detects a connected component in the bit pattern. The counting stage counts the number of connected components detected in the input stage and generates a current representing that number. The bit-preparing stage generates more than one current as a basis for information including more than one bit, based on the current generated in the counting stage, so that the information uniquely represents the number of connected components. The bit-output stage converts the currents generated in the bit-preparing stage into a digital output corresponding to the information.

18 Claims, 5 Drawing Sheets

OTHER PUBLICATIONS

Matsumoto, T; Chua, L.O.; Suzuki, H, "CNN Cloning Template: Connected Component Detector", IEEE Transactions on Circuits and Systems, vol. 37, No. 5, May 1990.*

Yang, Hong-Kui; Yakout, Mohamed A.; El-Masry, Ezz I., "Current-Mode Implementation of Discrete-Time Cellular Neural Networks Using the Pulse Width Modulation Technique", Proceedings of the 37th Midwest Symposium on Circuits and Systems, vol. 1, Aug. 1994.*

Crus, J.M.; Chua, L.O., "A CNN Chip for Connected Component Detection", IEEE Transactions on Circuits and Systems, vol. 38, No. 7, Jul. 1991.*

Li Guoxing; Shi Bingxue, "A Current-mode CNN Feature Extractor for Handwritten Digit☐☐Classification," CCNNSP, Shantou, China, Dec. 1999.*

Li, Guoxing; Shi, Bingxue; Lu, Wei, "A Modified Current Mode Hamming Neural Network for Totally Unconstrained Handwritten Recognition", IEEE, 1998.*

Li Guoxing, Shi Bingxue, "A Current-mode CNN Feature Extractor for Handwritten Digit Classification," CCNNSP, Shantou, China, Dec. 1999. (Including uncertified English language translation.).

* cited by examiner

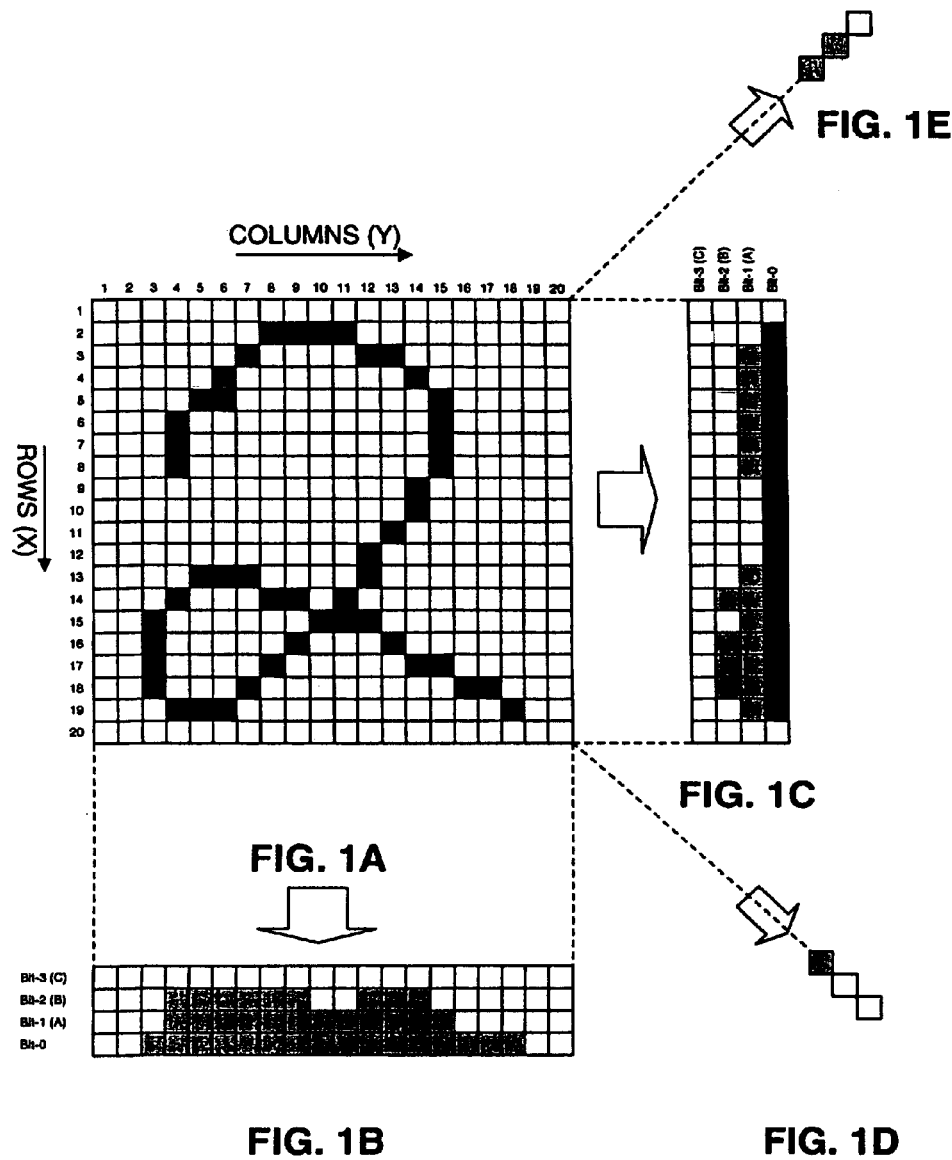

US 7,020,334 B2

CIRCUIT FOR EXTRACTING CONNECTED COMPONENT FEATURES FROM AN IMAGE

BACKGROUND OF THE INVENTION

1. Field of the Invention

The present invention is generally related to systems, circuits, and methods for processing images of written or printed characters to recognize such characters and, more particularly, related to systems, circuits, and methods for extracting connected component features from images.

2. Description of the Related Art

For character recognition, connected component features are extracted from images of the input characters and, based on these features, classification is performed. For purposes of the description herein, the image of the character to be recognized is composed of pixels that are dark relative to the balance of the pixels in the image. For convenience of illustration and explanation, dark and light pixels will be referred to herein as black and white pixels, respectively. A "connected component" is a group of connected black pixels surrounded by white pixels. A single isolated black pixel is also counted as a "connected component." To achieve high performance in classification, connected component feature extraction plays a significant role.

Hereinafter, classification of handwritten digits is described as an example of character recognition. Since the strokes of digits make up the basis of other kinds of characters, techniques for handwritten digit classification can be applied to other character recognition as well.

FIG. 1A shows an example of a normalized 20×20 handwritten digit image matrix, in which the pixels in row X and column Y are each referred to as (X, Y). Each black pixel is represented by "1," and each white pixel is represented by "0." An exemplary feature extraction process on this image matrix, which the inventors proposed in the paper entitled "A Current-mode CNN Feature Extractor for Handwritten Digit Classification," is described below. The paper was released in the Proceedings of 1999 Chinese Conference on Neural Network and Signal Processing (CCNNSP) in December 1999.

First, the number of connected components is counted for each of the 20 columns in the horizontal direction. The result of this counting is shown in FIG. 1B. For example, column 3 has only one connected component from (15, 3) to (18, 3), column 4 has three connected components: the first one is from (6, 4) to (8, 4); the second one is (14, 4); and the third one is (19, 4), and so forth. Succeedingly or concurrently, the number of connected components is counted for each of the 20 rows in the vertical direction. The result of this counting is shown in FIG. 1C. For example, row 2 has only one connected component from (2, 8) to (2, 11), row 3 has two connected components: the first one is (3, 7); and the second one is from (3, 12) to (3, 13), and so forth.

Because the number of strokes of handwritten digits is relatively low, the number of connected components in any row or column is usually four or less. This is the reason for which the results shown in FIGS. 1B and 1C have four bits from Bit-0 to Bit-3 for each of the 20 columns and rows. Here, Bit-0 is redundant in either the horizontal or vertical direction. This is because Bit-0 is always "1" within the area of a normalized image of one digit and thus does not provide any classification information. Bit-0 is therefore eliminated, leaving a 3×20-bit connected component feature acquired for each of the horizontal and vertical directions.

Further, the number of connected components is counted in one diagonal direction. In a positive diagonal direction from upper-left to lower-right, two connected component are found at (5, 5) and (12, 12). Since, as described above, the first bit is redundant and thus can be eliminated, a 3-bit connected component feature (1, 0, 0) is acquired for the positive diagonal direction, as shown in FIG. 1D. Succeedingly or concurrently, the number of connected components is counted in the other diagonal direction. In this negative diagonal direction, two connected components are found at (18, 3) and at (6, 15). With the elimination of the first bit, a 3-bit connected component feature (1, 0, 0) is acquired for the negative diagonal direction, as shown in FIG. 1E.

The 60-bit feature acquired for each of the horizontal and vertical directions can be compressed into a 40-bit feature as follows. In the 3×20-bit feature of each of FIGS. 1B and 1C, if the next higher bit is "1," the immediate lower bit is also "1" for every column or row. Compression of the feature information is performed based on this correlation. An aspect of this compression into fewer bits is illustrated in FIG. 2A, using a 2×2-bit matrix as an example. To implement this idea for a 3×2-bit matrix, a logic circuit including three NOR gates and three Exclusive-OR gates connected as shown in FIG. 2B can be employed. After processing by the circuit of FIG. 2B, the 3×20-bit feature of FIG. 1B is compressed into a 3×10-bit feature, as shown in FIG. 3A. Similarly, the 3×20-bit feature of FIG. 1C is compressed into a 3×10-bit feature, as shown in FIG. 3B.

In FIG. 2B, each of the inputs A, B, and C represents Bit-1, Bit-2, and Bit-3 of FIGS. 1B/1C, respectively. The first output ($O_0$, $O_1$, $O_2$) is calculated when Bit-1 at column 1, Bit-1 at column 2, Bit-2 at column 1, Bit-2 at column 2, Bit-3 at column 1, and Bit-3 at column 2 are input to the circuit as $A_0$, $A_1$, $B_0$, $B_1$, $C_0$, $C_1$, respectively. The second output ($O_0$, $O_1$, $O_2$) is calculated when Bit-1 at column 3, Bit-1 at column 4, Bit-2 at column 3, Bit-2 at column 4, Bit-3 at column 3, and Bit-3 at column 4 are input to the circuit as $A_0$, $A_1$, $B_0$, $B_1$, $C_0$, $C_1$, respectively. By continuing the calculation process in this manner, ten outputs ($O_0$, $O_1$, $O_2$), i.e., a 3×10-bit feature, is acquired.

To compensate for a loss of information during the above compression process, seven other bits are added to the feature vector, as shown in FIGS. 3A and 3B. These 7 bits are acquired by counting the number of connected components in the 3×20-bit feature matrix. For example, in FIG. 3A, row A has one connected component from column 4 to 15, and row B has two connected components from column 4 to 9 and from 12 to 14.

Finally, a 40-bit feature vector is acquired for the horizontal and one diagonal directions, by including the 3×10-bit feature of FIG. 3A, the 7-bit feature of FIG. 3A, and the 3-bit feature of FIG. 1D. Similarly, another 40-bit feature vector is acquired for the vertical and the other diagonal directions, by including the 3×10-bit feature of FIG. 3B, the 7-bit feature of FIG. 3B, and the 3-bit feature of FIG. 1E. The total 80-bit feature vector is used in classification in the next stage.

The connected component features are relatively invariant against transforming or rotating of the handwritten character, and therefore enable the classification with high performance. In the above example, the connected component feature extraction is performed upon acquiring the 4×20-bit matrices of FIGS. 1B and 1C, the 4-bit features a part of which becomes the 3-bit features of FIGS. 1D and 1E, and the 7-bit features shown in FIGS. 3A and 3B.

A neural network is currently used to perform connected component feature extraction. However, since neural networks are relatively complex and tend to consume a large amount of electrical power, a feature extractor with a simpler structure is desired, especially for portable use of character recognition. Further, it is desired to accelerate a processing speed of the feature extractors.

SUMMARY OF THE INVENTION

Circuits and methods consistent with the present invention can extract a connected component feature.

A circuit consistent with the invention comprises an input stage, a counting stage, a bit-preparing stage, and an output stage. The input stage is configured to receive an input pattern that can include a plurality of bits in a row and detect as a connected component a contiguous set of one or more of the plurality of bits in the row. The counting stage, coupled to the input stage, is configured to count a number of the connected components detected in the input stage and generate a current representing the number of the connected components. The bit-preparing stage, coupled to the counting stage, is configured to generate a plurality of currents as a basis for bit-information including more than one bit, based on the current generated in the counting stage, wherein the bit-information uniquely represents the number of the connected components. The output stage, connected to the bit-preparing stage, is configured to convert the plurality of currents generated in the bit-preparing stage into a digital output corresponding to the bit-information.

Another circuit consistent with the invention comprises logic gates, first current mirrors, second current mirrors, third current mirrors, and converters. The logic gates may receive a bit pattern, and produce a signal when "0" succeeded by "1" is detected in the bit pattern. The first current mirrors may accumulate the signal produced by the logic gates as a current for the bit pattern, and produce a sum current representing a number of times when "0" succeeded by "1" is detected in the bit pattern. The second current mirrors may mirror the sum current produced by the first current mirrors. The third current mirrors may produce a plurality of different mirrored currents. The converters may convert a plurality of comparison currents into a digital output representing the connected component feature, wherein each of the plurality of comparison currents represents a difference between a corresponding one of the plurality of different mirrored currents and the mirrored sum current.

A method consistent with the invention detects, in an input pattern including a plurality of bits in a row, as a connected component a contiguous set of one or more of the plurality of bits in the row. A sum current representing a number of the connected components is then generated by using first current mirrors in the circuit. Thereafter, more than one current are generated as a basis for bit-information including more than one bit based on the sum current by using second current mirrors in the circuit, wherein the bit-information uniquely represents the number of the connected components. Finally, a digital output corresponding to the bit-information is output by using converters in the circuit, which convert the more than one current into the digital output.

BRIEF DESCRIPTION OF THE DRAWINGS

The accompanying drawings provide a further understanding of the invention and are incorporated in and constitute a part of this specification. The drawings illustrate various embodiments of the invention and, together with the description, serve to explain the principles of the invention.

FIG. 1A shows an example of a normalized image of a handwritten digit;

FIG. 1B shows a 4×20-bit connected component feature extracted from the image of FIG. 1A in a horizontal direction;

FIG. 1C shows a 4×20-bit connected component feature extracted from the image of FIG. 1A in a vertical direction;

FIG. 1D shows a 3-bit connected component feature extracted from the image of FIG. 1A in a positive diagonal direction;

FIG. 1E shows a 3-bit connected component feature extracted from the image of FIG. 1A in a negative diagonal direction;

DETAILED DESCRIPTION

The following detailed description refers to the accompanying drawings. Although the description includes exemplary implementations, other implementations are possible and changes may be made to the implementations described without departing from the spirit and scope of the invention. The following detailed description does not limit the invention. Instead, the scope of the invention is defined by the appended claims. Wherever possible, the same reference numbers will be used throughout the drawings and the following description to refer to the same or like parts.

Figure 2B:
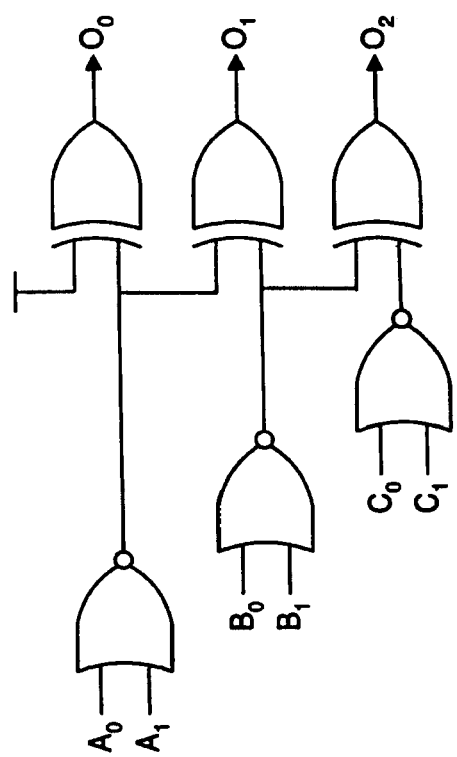
FIG. 2B illustrates a logic circuit that can be used for the compression.
Figure 2A:
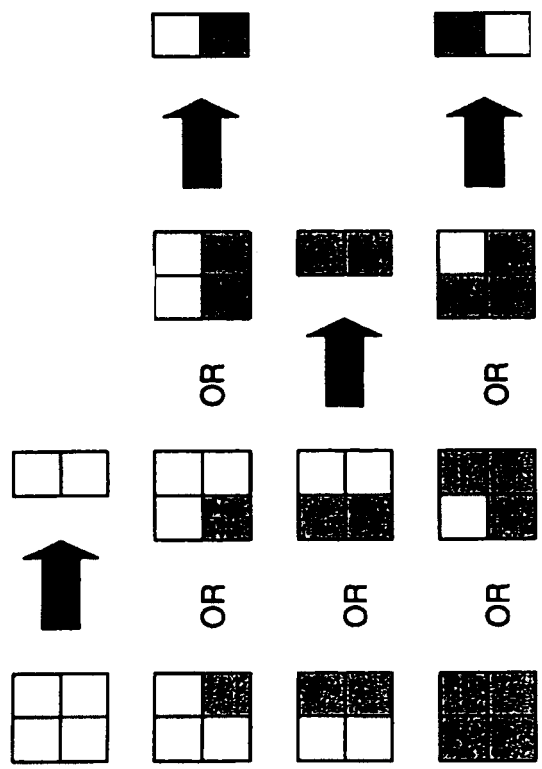
FIG. 2A illustrates exemplary compression of connected component features.
Figure 3A:
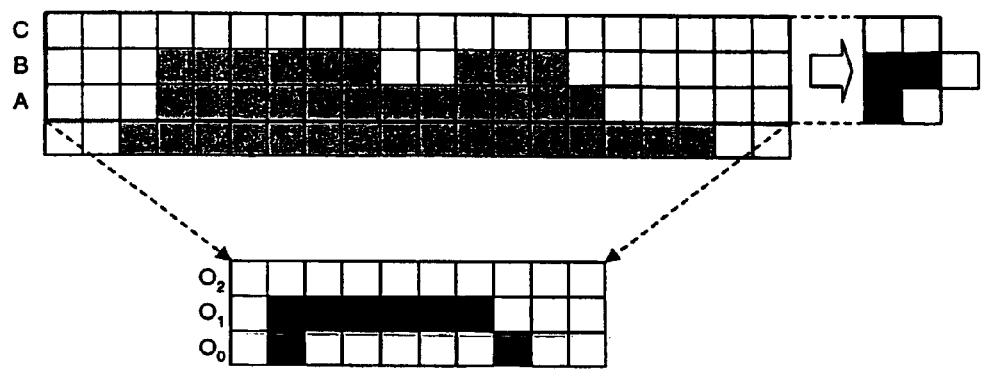
FIG. 3A shows a 3×10 plus 7-bit connected component feature acquired by compressing the data of FIG. 1B.
Figure 3B:
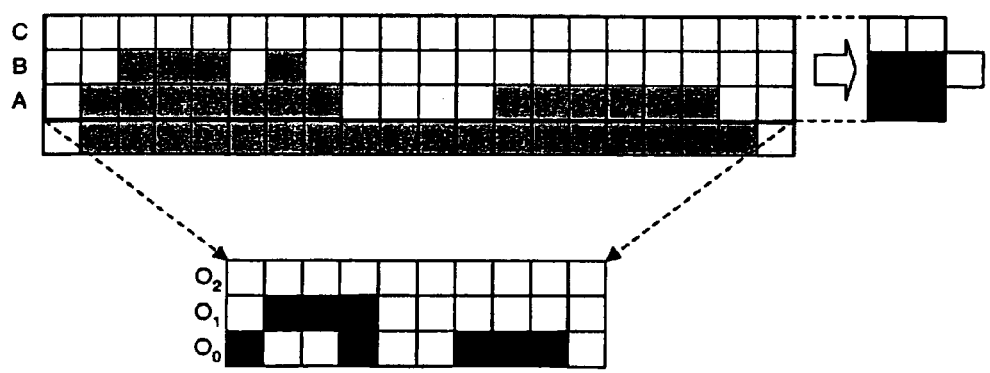
FIG. 3B shows a 3×10 plus 7-bit connected component feature acquired by compressing the data of FIG. 1C.
Figure 4:
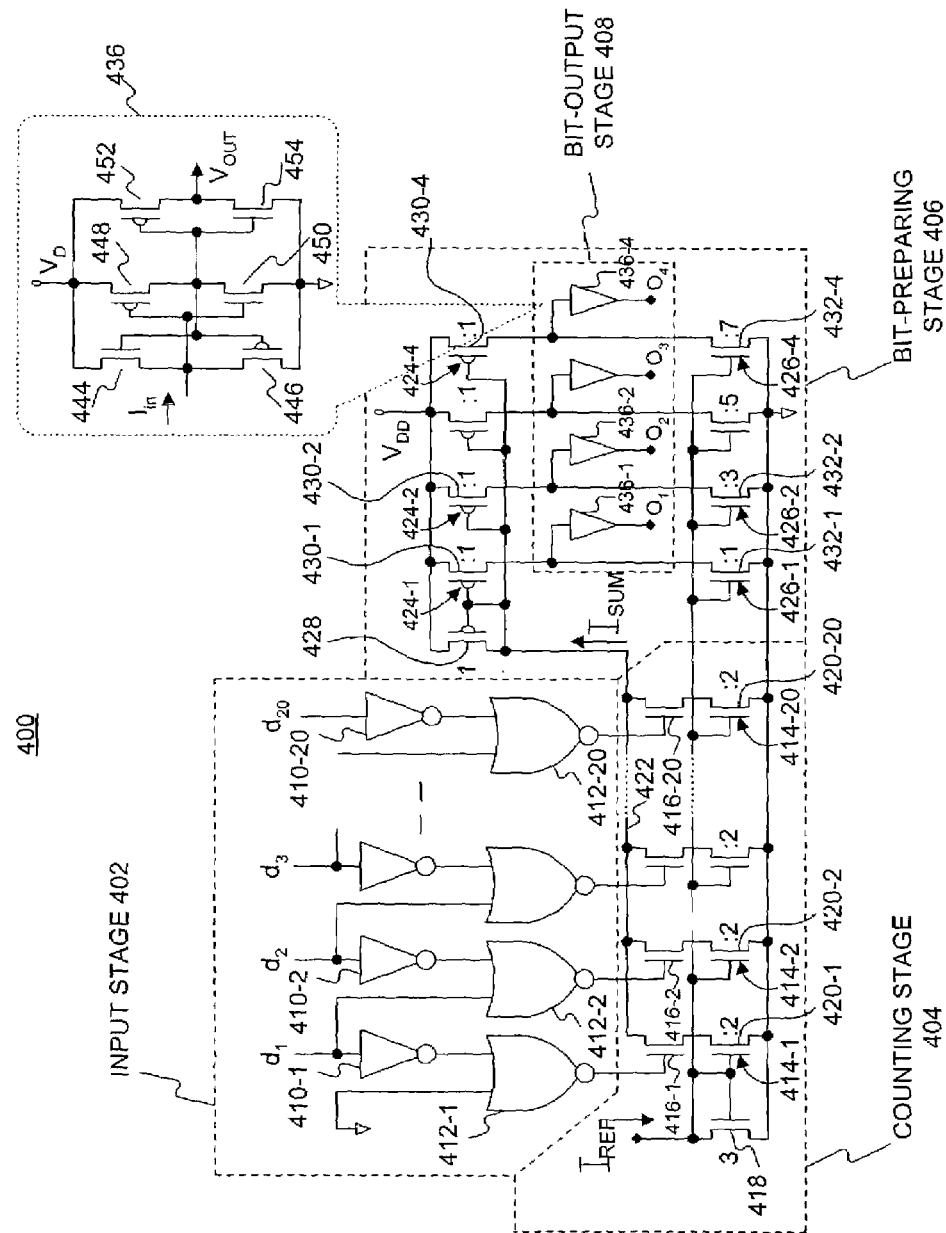
FIG. 4 illustrates an exemplary circuit for connected component feature extraction consistent with the present invention.

FIG. 4 shows an exemplary circuit 400 consistent with the present invention. Circuit 400 functions as a feature extractor that extracts a 4-bit connected component feature ($O_1$, $O_2$, $O_3$, $O_4$) from an image containing 20 bits in a row ($d_1$, $d_2$, $d_3$, ..., $d_{20}$). Therefore, circuit 400 can operate on the 4×20-bit matrices of FIGS. 1B and 1C by inputting values of the pixels in the vertical and horizontal directions, respectively. Circuit 400 can also acquire the 4-bit features having the 3-bit features shown in FIGS. 1D and 1E by inputting values of the pixels in the positive and negative diagonal directions, respectively. Circuit 400 can further extract 4×3-bit features from the data of FIGS. 1B and 1C, and after elimination of useless bits for classification, the 7-bit features shown in FIGS. 3A and 3B are acquired from these 4×3-bit features.

As will now be apparent to one of ordinary skill in the art, the numbers of inputs and outputs to and from circuit 400 and circuits consistent with the present invention are not limited to 20 and 4. Such circuits, including circuit 400 shown in FIG. 4, can readily be configured to accommodate any desired numbers of inputs and outputs. Those desired numbers can be determined based on requirements from a character-recognition application in which the circuit is to be used.

Circuit 400 has four stages: an input stage 402, a counting stage 404, a bit-preparing stage 406, and a bit-output stage 408.

Input stage 402 comprises the following logic gates: twenty NOT gates 410 (410-1, 410-2, ..., 410-20) and twenty NOR2 (2-input NOR) gates 412 (412-1, 412-2, ..., 412-20). Those logic gates can be formed using CMOS technology. The number N of connected components can be calculated with equation (1):

$$N = \sum_{i=1}^{20} NOR[d_{i-1}, \{NOT(d_i)\}], \quad (1)$$

where $d_0$ is always equal to "0." The calculation of NOR $[d_{i-1}, \{NOT(d_i)\}]$ is performed by means of NOT gates 410 and NOR2 gates 412 in input stage 402.

Counting stage 404 is for counting the number of connected components, and comprises current mirrors 414 (414-1, 414-2, ..., 414-20) and analog switches 416 (416-1, 416-2, ..., 416-20). A current mirror is a circuit in which the output current is equal to the input current if the ratio of the mirror is 1:1. If the ratio of the mirror is M:K, the output current of the current mirror is equal to K/M of the input current, where K and M can be set to any value. Each current mirror 414 is composed of a first NMOS transistor 418, which inputs a reference current $I_{REF}$, and a second NMOS transistor 420 (420-1, 420-2, ..., 420-20), which outputs a mirrored current. As noted in FIG. 4, the ratio M:K is 3:2 for each current mirror 414, and thus the output current from each current mirror 414 will be $2I_{REF}/3$.

Transistor 418 is connected so that the input current passes from the drain to the source thereof. In each current mirror 414, the gates of transistors 418 and 420 are connected, and also the sources of transistors 418 and 420 are connected. This configuration creates the mirrored current which is output through the drain of transistor 420. In circuit 400, transistor 418 is common to all twenty current mirrors 414. For example, current mirror 414-1 is composed of transistors 420-1 and 418, and current mirror 414-2 is composed of transistors 420-2 and 418.

If there is a connected component in the input pattern, the output of NOR2 gate 412 will be high. That is, if and only if $d_{i-1}$="0" and $d_i$="1," the output of NOR2 gate 412-$i$ will be high. This high level output turns on corresponding analog switch 416-$i$, and thus only the mirrored current that is output from transistor 420-$i$ of current mirror 414-$i$ will flow into an upper line 422. If, for example, analog switches 416-3 and 416-14 are turned on, the mirrored current $2I_{REF}/3$ from current mirror 414-3 through analog switch 416-3 flows to the right-hand side on upper line 422. Also, the mirrored current $2I_{REF}/3$ from current mirror 414-14 through analog switch 416-14 is added to the current flowing to the right-hand side on upper line 422. In other words, the results of the calculation in input stage 402 are shifted to the right-hand side by current mirrors 414 and analog switches 416 of counting stage 404. As a result, counting stage 404 outputs on line 422 a sum current $I_{SUM}$, which corresponds to the value of the sum in equation (1). If there are N connected components in the input pattern, the sum current $I_{SUM}$ will be equal to $2NI_{REF}/3$.

Bit-preparing stage 406 is for preparing a basis for 4-bit information according to the counted number of connected components, and comprises PMOS current mirrors 424 (424-1, 424-2, 424-3, 424-4) and NMOS current mirrors 426 (426-1, 426-2, 426-3, 426-4). Each PMOS current mirror 424 is composed of a first PMOS transistor 428, which inputs the sum current $I_{SUM}$, and a second PMOS transistor 430 (430-1, 430-2, 430-3, 430-4), which outputs a mirrored current. Thus, PMOS transistor 428 is common to all four current mirrors 424. As noted in FIG. 4, all PMOS current mirrors 424 are identical and have a mirror ratio of 1:1. Since $I_{SUM}=2NI_{REF}/3$ as described above, each of the four mirrored currents from PMOS current mirrors 424 is $2NI_{REF}/3$.

Transistor 428 is connected so that the input current passes from the source to drain thereof. In each PMOS current mirror 424, the gates of transistors 428 and 430 are connected, and also the drains of transistors 428 and 430 are connected. This configuration creates the mirrored current which is output through the source of each transistor 430.

On the other hand, each NMOS current mirror 426 is composed of first NMOS transistor 418, which inputs the reference current $I_{REF}$, and a second NMOS transistor 432 (432-1, 432-2, 432-3, 432-4), which outputs a mirrored current. As noted in FIG. 4, NMOS current mirrors 426 have the respective M:K ratios 3:1, 3:3, 3:5, and 3:7. These four ratios are determined such that some NMOS current mirrors 426 output a current larger than $I_{SUM}$ from PMOS current mirrors 424, while the remaining NMOS current mirrors 426 output a current smaller than $I_{SUM}$. This grouping of NMOS current mirrors 426 becomes different for a different value of N. In this example, $I_{SUM}=2NI_{REF}/3$ (N=1, 2, 3 or 4), and the four mirrored currents from NMOS current mirrors 426-1, 426-2, 426-3, 426-4 are $I_{REF}/3$, $I_{REF}$, $5I_{REF}/3$, and $7I_{REF}/3$, respectively.

In each NMOS current mirror 426, the gates of transistors 418 and 432 are connected, and also the drains of transistors 418 and 432 are connected. In circuit 400, transistor 418 is common to not only all four current mirrors 426 but also all twenty current mirrors 414.

Bit-output stage 408 is for creating and outputting 4-bit information based on the currents generated in stage 406, and comprises four analog-to-digital converters 436 (436-1, 436-2, 436-3, 436-4). Each analog-to-digital converter 436 is constituted by a current comparator, and inputs for comparison a current equal to a difference between the output current from each PMOS current mirror 424 and the output current from each corresponding NMOS current mirror 426. For example, analog-to-digital converter 436-2 inputs for comparison a current equal to the difference between the respective output currents from PMOS current mirror 424-2 and NMOS current mirror 426-2. The compared current input to analog-to-digital converter is shown as $I_{in}$ in FIG. 4.

In the case of N=1, since $I_{SUM}=2I_{REF}/3$, analog-to-digital converter 436-1 inputs a positive current (i.e., $(2I_{REF}/3-I_{REF}/3)>0$), and analog-to-digital converter 436-2, 436-3, and 436-4 input negative currents (i.e., $(2I_{REF}/3-I_{REF})<0$; $(2I_{REF}/3-5I_{REF}/3)<0$; $(2I_{REF}/3-7I_{REF}/3)<0$), as $I_{in}$. In the case of N=2, since $I_{SUM}=4I_{REF}/3$, comparing this value with $I_{REF}/3$, $I_{REF}$, $5I_{REF}/3$, and $7I_{REF}/3$, respectively, analog-to-digital converters 436-1 and 436-2 input positive currents, and analog-to-digital converters 436-3 and 436-4 input negative currents. In the case of N=3, since $I_{SUM}=2I_{REF}$, analog-to-digital converter 436-4 inputs a negative current and analog-to-digital converters 436-1, 436-2, and 436-3 input positive currents. In the case of N=4, since $I_{SUM}=8I_{REF}/3$, all the analog-to-digital converters input positive currents.

Accordingly, analog-to-digital converters 436 respectively receive the basis for 4-bit information as four values of $I_{in}$, and output four voltages ($O_1$, $O_2$, $O_3$, $O_4$). Each output voltage has a value of "1" (or "high") when the value $I_{in}$ is positive, and has a value of "0" (or "low") when the value of $I_{in}$ is negative. Therefore, ($O_1$, $O_2$, $O_3$, $O_4$) will be (1, 0, 0, 0) in the case of N=1; (1, 1, 0, 0) in the case of N=2; (1, 1, 1, 0) in the case of N=3; and (1, 1, 1, 1) in the case of N=4.

Current mirrors and current comparators can be fabricated in CMOS technology, as shown in FIG. 4. FIG. 4 further illustrates a structure of converter 436 suitable for fabrication in CMOS technology in a detailed view. In converter 436, transistors 448 and 450 constitute a first inverter, and transistors 452 and 454 constitute a second inverter. The output of the first inverter is connected with the input of the second inverter. A NMOS transistor 444 and a PMOS transistor 446 are connected with the first inverter to form a feedback loop. When $I_{in}$=0, an equilibrium will be set up due to the feedback loop. When $I_{in}$>0, the source voltage of PMOS transistor 446 will increase. Then, positive feedback will cause the gate voltage of PMOS transistor 446 to be low, and thus drive $V_{out}$ of the second inverter to a "high" value corresponding to "1." Similarly, when $I_{in}$<0, $V_{out}$ of the second inverter will be driven to a "low" value corresponding to "0."

Figure 5A:
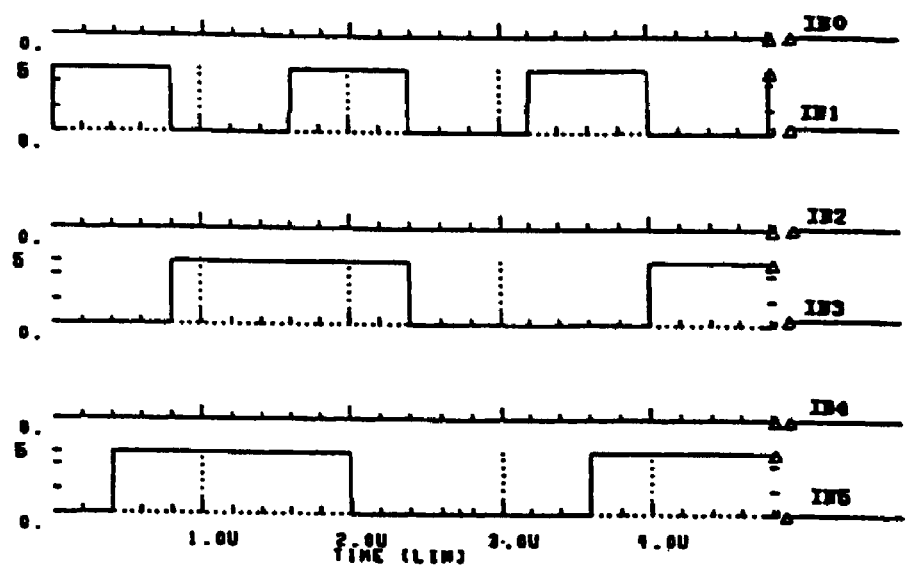
FIG. 5A shows input waves applied to a simulation of the circuit shown in FIG. 4.
Figure 5B:
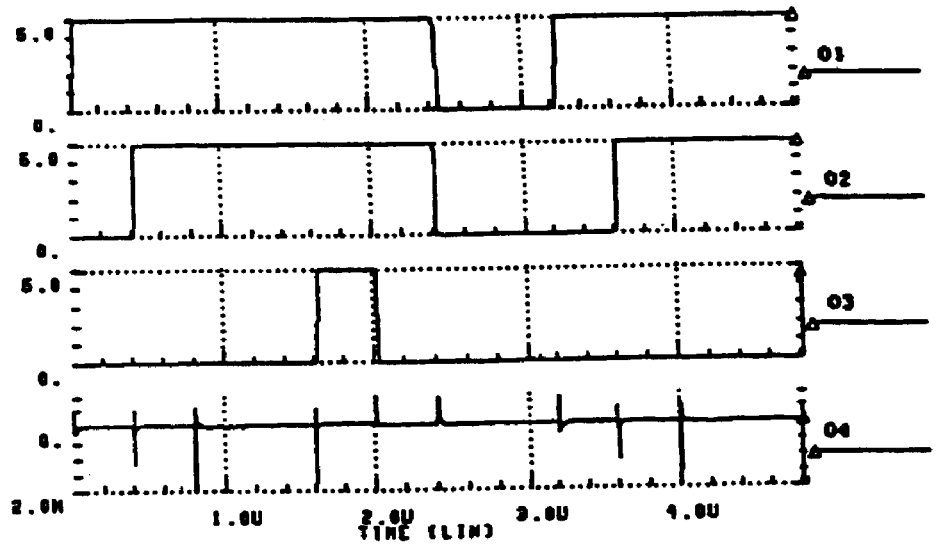
FIG. 5B shows results of the circuit simulation for the input waves shown in FIG. 5A.

FIGS. 5A and 5B show that circuit 400 provides good performance in an HSPICE simulation. HSPICE is a standard, commercially available circuit simulation program. In this simulation, 20 bits of inputs were grouped into five groups and each group included four neighbor bits. The input waves are plotted in FIG. 5A, and the simulated results are shown in FIG. 5B. The results demonstrate that the circuit of FIG. 4 can effectively and accurately extract connected component features from an input vector.

For example, as shown in FIG. 5A, at time 0.0–0.4, N=1 since the pattern of "0" succeeded by "1" only occurs between IN0 (IN0 is always "0" as $d_0$) and IN1. FIG. 5B shows that (O1, O2, O3, O4) in this time period is (1, 0, 0, 0). At time 0.4–0.8, N=2 since the pattern of "0" succeeded by "1" occurs twice: one occurrence is between IN0 and IN1, and the other occurrence is between IN4 and IN5 as shown in FIG. 5A. FIG. 5B shows that (O1, O2, O3, O4) in this time period is (1, 1, 0, 0). At time 0.8–1.6, N=2 since the pattern of "0" succeeded by "1" occurs twice: one occurrence is between IN2 and IN3, and the other occurrence is between IN4 and IN5 as shown in FIG. 5A. FIG. 5B shows that (O1, O2, O3, O4) in this time period is (1, 1, 0, 0). At time 1.6–2.0, N=3 since the pattern of "0" succeeded by "1" occurs three times: first between IN0 and IN1, second between IN2 and IN3, and third between IN4 and IN5 as shown in FIG. 5A. FIG. 5B shows that (O1, O2, O3, O4) in this time period is (1, 1, 1, 0). In this example of FIG. 5A, O4 is always low as shown in FIG. 5B using a different scale than those of O1–O3, because the maximum number of connected components are three.

Persons of ordinary skill will realize that many modifications and variations of the above embodiments may be made without departing from the novel and advantageous features of the present invention. For example, a synchronous clock can be inserted by means of substituting NAND2 (2-input NAND) gates for NOT gates 410, if a clock signal is required to synchronize all the parts of the feature extractor circuit.

Accordingly, all such modifications and variations are intended to be included within the scope of the appended claims. The specification and examples are only exemplary. The following claims define the true scope and spirit of the invention.

We claim:

1. A circuit for extracting a connected component feature, comprising:
    an input stage configured to receive an input pattern that can include a plurality of bits in a row and detect as a connected component a contiguous set of one or more of the plurality of bits in the row;
    a counting stage, coupled to the input stage, configured to count a number of the connected components detected in the input stage and generate a current representing the number of the connected components;
    a bit-preparing stage, coupled to the counting stage, configured to generate a plurality of currents as a basis for bit-information including more than one bit, based on the current generated in the counting stage, the bit-information uniquely representing the number of the connected components; and
    an output stage, connected to the bit-preparing stage, configured to convert the plurality of currents generated in the bit-preparing stage into a digital output corresponding to the bit-information.

2. The circuit of claim 1, wherein the input stage includes logic gates to detect the connected component when a pattern in which "0" is succeeded by "1" occurs in the input pattern.

3. The circuit of claim 2, wherein each of the logic gates in the input stage comprises a NOT gate coupled to receive one bit in the input pattern and a NOR gate coupled to receive a preceding bit in the input pattern precedent to said one bit and an output bit output from the NOT gate.

4. The circuit of claim 1, wherein the counting stage includes current mirrors and analog switches to cumulatively shift a result of the detection of the connected components in one direction to generate the current.

5. The circuit of claim 4, wherein each of the current mirrors in the counting stage has a M:K ratio, and the current is generated having a magnitude K/M times a reference current multiplied by the number of the connected components.

6. The circuit of claim 1, wherein the bit-preparing stage includes current mirrors, and at least some of the current mirrors produce mirrored currents according to different ratios from one another, corresponding to said more than one bit.

7. The circuit of claim 6, wherein each of the plurality of currents is generated by comparing the current generated in the counting stage with a corresponding one of the mirrored currents produced by one of said at least some of the current mirrors, said different ratios being set such that a different number of the plurality of currents becomes positive for a different number of the connected components.

8. The circuit of claim 1, wherein the output stage comprises analog-to-digital converters to produce the digital output as voltages, each bit in the digital output indicating whether a corresponding one of the plurality of currents is positive or negative.

9. A circuit for extracting a connected component feature, comprising:
    logic gates for receiving a bit pattern, and for producing a signal when "0" succeeded by "1" is detected in the bit pattern;
    first current mirrors for accumulating the signal produced by the logic gates as a current for the bit pattern, and for producing a sum current representing a number of times when "0" succeeded by "1" is detected in the bit pattern;

second current mirrors for mirroring the sum current produced by the first current mirrors;

third current mirrors for producing a plurality of different mirrored currents; and converters for converting a plurality of comparison currents into a digital output representing the connected component feature, each of the plurality of comparison currents representing a difference between a corresponding one of the plurality of different mirrored currents and the mirrored sum current.

10. The circuit of claim 9, wherein the logic gates, the first, second, and third current mirrors, and the converters are formed by CMOS technology.

11. A method for extracting a connected component feature using a circuit, comprising:

detecting, in an input pattern including a plurality of bits in a row, as a connected component a contiguous set of one or more of the plurality of bits in the row;

generating a sum current representing a number of the connected components by using first current mirrors in the circuit;

generating more than one current as a basis for bit-information including more than one bit based on the sum current by using second current mirrors in the circuit, the bit-information uniquely representing the number of the connected components; and outputting a digital output corresponding to the bit-information by using converters in the circuit to convert the more than one current into the digital output.

12. The method of claim 11, wherein the step of detecting includes detecting the connected component by logic gates when a pattern in which "0" is succeeded by "1" occurs in the input pattern.

13. The method of claim 12, wherein the step of detecting includes receiving by a NOT gate one bit in the input pattern, and receiving by a NOR gate a preceding bit in the input pattern precedent to said one bit and an output bit output from the NOT gate.

14. The method of claim 11, wherein the step of generating the sum current includes cumulatively shifting, by said first current mirrors and analog switches, a result of the detection of the connected components in one direction.

15. The method of claim 14, wherein each of the first current mirrors has a M:K ratio, and the sum current is generated having a magnitude K/M times a reference current multiplied by the number of the connected components.

16. The method of claim 11, wherein the step of generating the more than one current includes producing, by at least some of the second current mirrors, mirrored currents according to different ratios from one another, corresponding to said more than one bit.

17. The method of claim 16, wherein each of the more than one current is generated by comparing the sum current with a corresponding one of the mirrored currents, said different ratios being set such that a different number of the more than one current becomes positive for a different number of the connected components.

18. The method of claim 11, wherein the step of outputting includes producing, by said converters, the digital output as voltages, each bit in the digital output indicating whether a corresponding one of the more than one current is positive or negative.

* * * * *